United States Patent [19]

Killian

[11] 4,189,950
[45] Feb. 26, 1980

[54] MANUAL CONTROL APPARATUS

[75] Inventor: Henry R. Killian, Sugarland, Tex.

[73] Assignee: Keystone International, Inc., Houston, Tex.

[21] Appl. No.: 877,689

[22] Filed: Feb. 13, 1978

Related U.S. Application Data

[63] Continuation-in-part of Ser. No. 712,371, Aug. 9, 1976, Pat. No. 4,080,844.

[51] Int. Cl.² .............................................. F16H 1/18
[52] U.S. Cl. ....................... 74/424.8 A; 74/424.8 UA
[58] Field of Search ................. 74/424.8 A, 424.8 UA

[56] References Cited

U.S. PATENT DOCUMENTS

| | | | |
|---|---|---|---|
| 1,454,574 | 5/1923 | Bown | 74/424.8 A |
| 1,905,569 | 4/1933 | Papellin | 74/424.8 A |
| 3,733,914 | 5/1973 | Sheesley | 74/424.8 A |
| 3,961,547 | 6/1976 | Shainberg et al. | 74/424.8 A |

*Primary Examiner*—C. J. Husar
*Assistant Examiner*—Conrad Berman
*Attorney, Agent, or Firm*—Browning, Bushman & Zamecki

[57] ABSTRACT

A manual override apparatus for use with normally, automatically, powered driving assemblies such as valve actuators, the override apparatus having a body with a bore therethrough, a housing secured to the body and having an axial bore which registers with the bore in the body, a rotatable split drive nut mounted in the housing, a drive screw extending into the registering bores in the body and the housing and mounted for axial movement therein, a camming system for selectively engaging and disengaging the drive nut with the drive screw whereby engagement of the drive screw with the drive nut and rotation of the drive nut causes axial movement of the drive screw, and a biasing assembly operatively connected to the split drive nut which exerts a biasing engagement force on the drive nut when a given magnitude of resistance to engagement is encountered.

25 Claims, 8 Drawing Figures

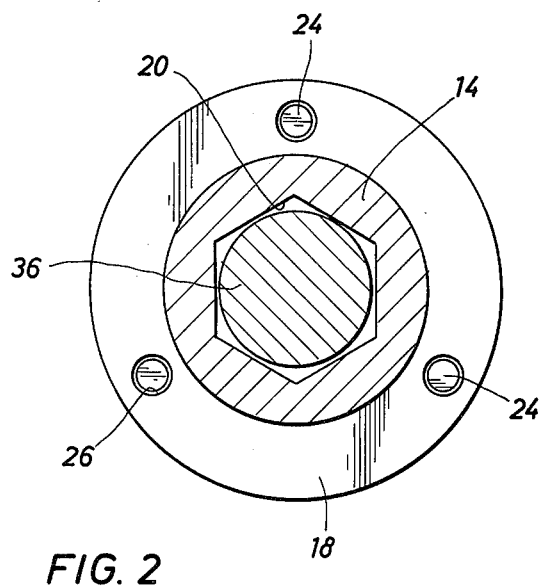
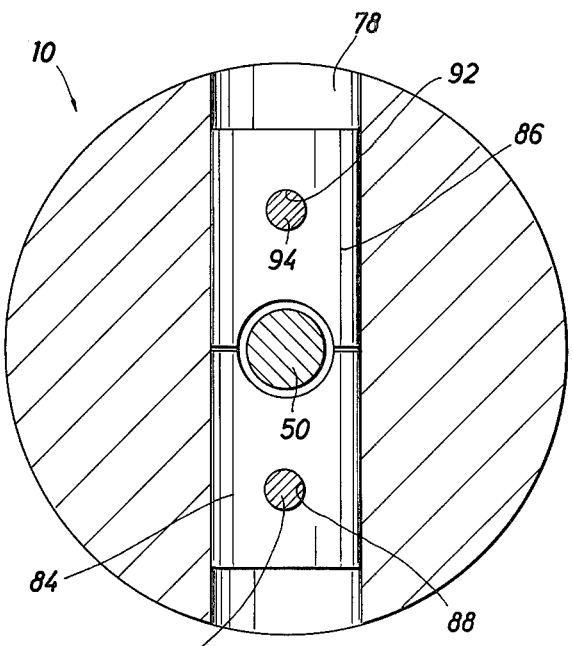
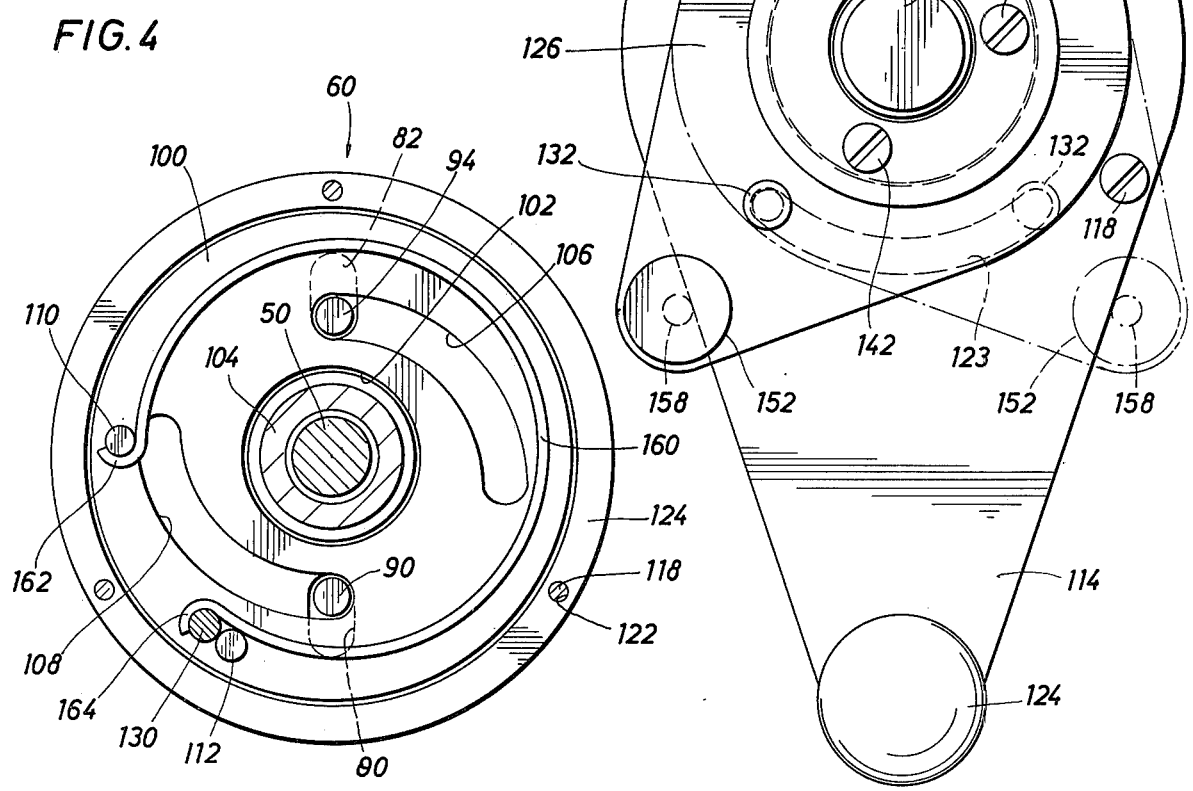

MANUAL CONTROL APPARATUS

CROSS-REFERENCE TO RELATED APPLICATION

This is a continuation-in-part application of co-pending application, Ser. No. 712,371, filed Aug. 9, 1976 and entitled "Manual Control Apparatus", now U.S. Pat. No. 4,080,844.

BACKGROUND OF THE INVENTION

The present invention pertains to manual control devices. More specifically, the present invention relates to a selectively engageable manual drive apparatus for use with a normally, automatically powered driving assembly having a movable member and a stationary member.

Automatically powered driving assemblies such as actuators of the type used to control valves typically employ reciprocating movement of a member such as a piston in a suitable chamber formed by a housing. The actuator includes suitable linkage means for converting the reciprocal movement of the piston to rotational movement which is translated to the valve element through a rotatable member such as the valve stem connected to the valve element. Actuators of the type described are particularly useful with butterfly or ball valves which employ such rotating valve elements.

Cylinder-piston type actuators used for automatic actuation of valves and other various devices employ hydraulic or pneumatic power. Since these power sources may from time to time fail, it becomes not only desirable, but in many cases necessary, to provide a means to manually control or override the actuator so as to be able, for example, to open or close the valve which is attached to the actuator. While such manual override means are known, most consume excessive amounts of space, are awkward to operate and are quite expensive.

SUMMARY OF THE INVENTION

It is therefore an object of the present invention to provide a selectively engageable and disengageable manual drive apparatus for use with a normally powered driving assembly.

Another object of the present invention is to provide a selectively engageable manual drive apparatus for use with a normally powered driving assembly of the piston-cylinder type.

Another object of the present invention is to provide a manual override for an actuator having a movable drive member and a stationary member.

An important object of the present invention is to provide a manual override apparatus which can be readily adapted to many standard types of cylinder actuators with a minimum amount of modification in the basic components of the actuator.

Other objects, features, and advantages of the present invention will become apparent from the description given herein, the drawings and the appended claims.

The selectively engageable manual drive apparatus of the present invention is comprised of a body having a bore therethrough and a housing secured to the body and having an axial bore registering with the bore in the body. Rotatable drive nut means are mounted in the housing and a drive screw means extends along the registering bores in the body and the housing and is mounted for axial movement therein. The apparatus also includes means for selectively engaging and disengaging the drive nut means and the drive screw means, engagement and rotation of the drive nut means resulting in axial movement of the drive screw means longitudinally through the registering bores.

There is also provided a selective biasing means connected to the drive nut means and which exerts a biasing engaging force on the drive nut if the drive nut encounters a given magnitude of resistance to engagement such as might be caused by non-meshing of the threads on the drive nut and drive screw. Preferably, the drive screw is adapted to be connected to a suitable connector rod which extends out of the body and which in turn is connectable to the movable member of an actuator such as, for example, the piston rod in a piston-cylinder actuator normally operated pneumatically or hydraulically.

BRIEF DESCRIPTION OF THE DRAWING

FIG. 2 is a view taken along the lines 2—2 of FIG. 1.

FIG. 3 is a view taken along the lines 3—3 of FIG. 1, showing the drive nut means and drive screw means engaged.

FIG. 4 is a view taken along the lines 4—4 of FIG. 1 showing the position of the biasing means and the camming plate when the drive nut means and drive screw are engaged.

FIG. 5 is an elevational view taken along the lines 5—5 of FIG. 1.

DESCRIPTION OF THE PREFERRED EMBODIMENTS

Figure 1:
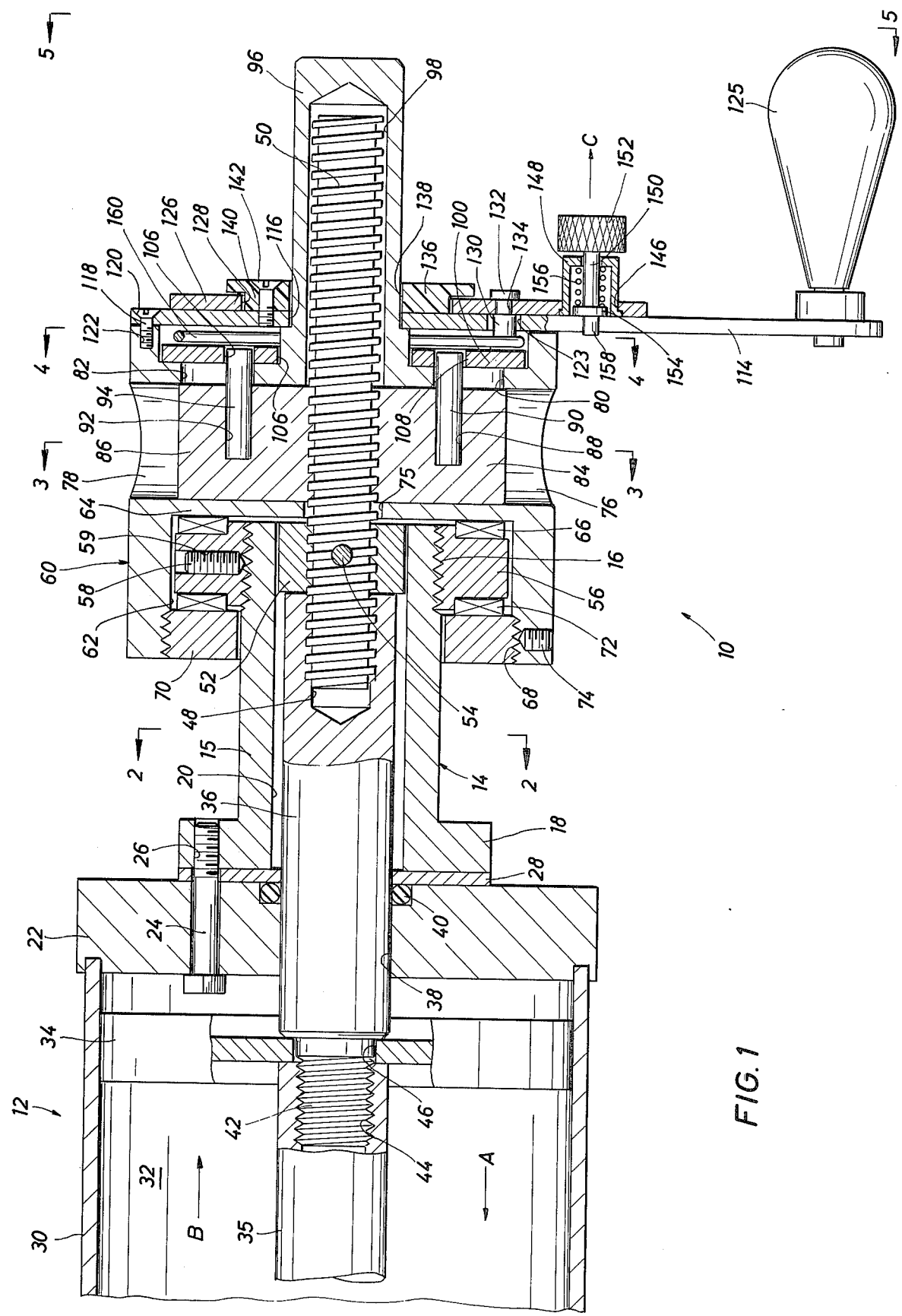
FIG. 1 is a side elevational view, partly in section, showing the manual override apparatus of the present invention connected to a typical piston-cylinder type actuator.

Referring then to FIG. 1, the manual override apparatus of the present invention, shown generally as 10, is connected to a piston-cylinder actuator, shown generally as 12. Override apparatus 10 comprises a body 14 having a generally cylindrical portion 15, one end of which is externally threaded as at 16. The other end of body 14 is provided with a radially, outwardly extending flange 18 integral with portion 15. A bore 20, extends generally through the center of body 14 and is broached, as seen in FIG. 2, so as to have a generally hexagonal cross-sectional shape.

Flange 18 is secured to the end cap 22 of actuator 12 by means of bolts 24 extending through end cap 22 and threadedly received in tapped bores 26 in flange 18. An "O" ring seal retainer and stop plate 28 is disposed between the external end surface of end plate 22 and the outer face of flange 18. End cap 22 and actuator housing 30 cooperate to form a cylindrical chamber 32. A piston 34 and piston rod 35 is mounted for reciprocation in chamber 32 in the direction shown by arrows A and B. Power to move piston 32 is supplied, in a conventional manner, from a suitable hydraulic or pneumatic source. It will be appreciated that actuator 12 can be single acting or double acting and, when used on rotary valves, will have suitable linkage connected to piston rod 35 for translating the reciprocal movement of piston 32 into rotational movement so as to operate the valve stem.

A connecting rod 36 disposed in bore 20 extends out of body 14 and through an aperture 38 in end cap 22, sealing between connecting rod 36 and end cap 22 being provided by O-ring 40. Connecting rod 36 has a reduced diameter, threaded end portion 42 which is received in a tapped bore 44 in piston rod 35, reduced end portion 42 extending through a central opening 46 in piston 34.

The other end of connecting rod 36 has a tapped bore 48 in which is received a threaded drive screw 50. A hexagonal nut 52 is threaded onto drive screw 50 and is prevented from relative rotation therewith by means of a pin 54 which keys screw 50 and nut 52 together.

Threadedly secured to the threaded end 16 of body 14 is a thrust collar 56, thrust collar 56 being fixed against movement relative to threaded portion 16 by means of set screws 58 received in tapped bores 59 is collar 56. A housing, shown generally as 60, has a counterbore 62 with a diameter slightly larger than the outside diameter of collar 56, collar 56 being received in counterbore 62. Housing 60 includes a wall portion 64 which defines the bottom of counterbore 62. A bushing 66 is disposed between wall 64 and thrust collar 56. Counterbore 62 is threaded as at 68 and receives a threaded end plate 70 having an aperture 71 through which extends body 14. A bushing 72 is disposed between end plate 70 and thrust collar 56. A set screw 74 is received in a tapped bore in housing 60 and serves to fix end plate 70 and housing 60 against any relative rotation. It can thus be seen that housing 60 together with end plate 70 can rotate relative to body 14, thrust collar 46 and bushings 66 and 72 serve as a bearing assembly.

Housing 60 is provided with an axial bore 75 which is generally in register with bore 20 in body 14 and which also receives screw 50. Housing 60 also has coaxial bores 76 and 78 disposed on diametrically opposite sides of bore 75, bores 76 and 78 actually forming a single bore, the axis of which is perpindicular to the axis of bore 75. Housing 60 also has a pair of diametrically opposed slots 80 and 82 which are aligned generally parallel to the axes of bores 76 and 78, respectively.

One half 84 of a split drive nut is slidably positioned in bore 76 so as to be movable toward and away from axial bore 75 and hence drive screw 50. The second half 86 of the split drive nut is slidably positioned in bore 78 to likewise move in a direction toward and away from drive screw 50. Drive nut half 84 is provided with a bore 88 which receives a cam pin 90. Likewise, drive nut half 86 has a bore 92 which receives a cam pin 94. It will be seen that pins 90 and 94 extend through slots 80 and 82, respectively, and are aligned generally axially with drive screw 50. Housing 60 also includes a generally axially extending boss 96 which has a bore 98 into and out of which screw 50 reciprocates.

A cam plate 100 having a circular aperture 102 encircles an externally upset neck portion 104 of boss 96 and abuts the bottom wall 104 of a second counterbore 107 in housing 60. As best seen with reference to FIG. 4, cam plate 100 has cam surfaces provided by arcuate slots 106 and 108. Slots 106 and 108 are eccentric with respect to one another, to axial bore 75 and aperture 102.

Cam pins 90 and 94 extend through slots 80 and 82, respectively, and are received in arcuate slots 80 and 106, respectively. Cam plate 100 can be rotated relative to housing 60 around neck portion 104 between terminal positions determined by the travel of cam pins 90 and 94 in slots 108 and 106, respectively. As best seen in FIG. 4, slots 106 and 108 are disposed relative to one another such that any rotational movement of cam plate 100 relative to housing 60 around the longitudinal axis of bore 75, will move pins 90 and 94, and hence drive nut halves 84 and 86, respectively, an equal distance toward or away from drive screw 50 depending on the direction of rotation of cam plate 100. Since screw 50 and bore 75 are coaxial, relative rotation of plate 100 and housing 60 in the proper direction will move nut halves 84 and 86 into full threaded engagement with screw 50. (See FIG. 3).

Secured to cam plate 100 are cam plate pins 110 and 112. As best seen with reference to FIG. 4, cam plate pins 110, 112 are generally circumferentially spaced from one another and protrude outwardly from cam plate 100, cam plate pins 110 and 112 forming abutment surfaces on one surface of cam plate 100.

A handle 114 having a circular aperture 116 and an armhole slot is secured to housing 60 by means of bolts 118 extending through bores 120 in handle 114 and being threadedly received in tapped bores 122 in the end face 124 of body 60. As best seen in FIG. 1, axial boss 96 which encases screw 50 extends through aperture 116. A knob 125 is rotatably secured to handle 114. It can thus be seen, that by grasping knob 125 and rotating handle 114, housing 60 will be caused to rotate, being affixed to handle 114.

A generally tear-dropped shaped (see FIG. 5) engagement plate 126 has a generally circular, central aperture 128 through which extends axial boss 96. Secured to engagement plate 126 is an engagement post 130, post 130 forming an engagement formation and being secured by means of a bolt 132 extending through an aperture 134 in engagement plate 126 and being threadedly received in a tapped bore in post 130.

A retainer plate 136 has a central aperture 138 through which extends axial bore 96. Retainer plate 136 has a reduced diameter portion 140 which is generally snuggly received in aperture 128 of engagement plate 126. Bolts 142 extend through suitable apertures in retainer plate 136 and are received in tapped bores in handle 114.

With reference to FIGS. 1 and 4, it can be seen that when retainer plate 136 is secured to handle 114, engagement post 130 is disposed between cam plate pins 110 and 112. Since engagement post 130 extends through arcuate slot 123 in handle 114, engagement plate 126 can be rotated relative to housing 60 and handle 114 between terminal positions defined by the opposite ends of arcuate slot 123. As seen hereinafter, such terminal positions represents engagement or disengagement of the drive screw 50 with the two halves 84 and 86 of the drive nut.

To provide a latching means whereby engagement plate 136 may be releasably latched in positions corresponding to the two terminal positions determined by slot 123, a detent system is secured to engagement plate 126. Engagement plate 126 is provided with an aperture 146 in which is fixedly received, in a suitable manner, a generally cylindrical spring housing 148. A detent pin 150 provided on one end with a knurled knob 152 has an annular flange 154 disposed intermediate its ends. A compression spring 156 is disposed between flange 154 and the end of spring housing 148 and serves to bias pin 150 toward handle 114. As best seen in FIGS. 1 and 5, in one of the terminal positions determined by slot 123, detent pin 150 has an end portion 158 which extends beyond flange 154 in engagement with one side edge of handle 114. In the position, shown in FIGS. 1 and 5, screw 50 and nut halves 84 and 86 are in engagement. To move nut halves 84 and 86 out of engagement with screw 50, knurled knob 152 is pulled outwardly in the direction shown by arrow C, whereby spring 156 is compressed between the end of housing 148 and flange 154. Engagement plate 126 is then rotated, relative to handle 114, whereby bolt 130 is moved through arcuate slot 123 to the other terminal position (shown in phantom in FIG. 5). In the latter position, the end 158 of pin 150 will now be in engagement with the other side edge of handle 114 and will remain latched in that position until knurled knob 152 is pulled outwardly away from housing 148 and engagement plate 126 is rotated relative to handle 114 as described.

It can be seen that engagement post 130 is disposed and movable between cam plate pins 110 and 112. A compression spring 160 having hook ends 162 and 164 is interconnected between cam plate pin 110 and engagement post 130. As best seen with reference to FIG. 4, hook end 162 engages cam plate pin 110 while hook end 164 engages engagement post 130. It will be appreciated that since spring 160 is in compression between pin 110 and post 130, post 130 is normally biased against cam plate pin 112. It will also be appreciated that any movement which decreases the distance between pin 110 and post 130 further compresses spring 160.

OPERATION

Referring to FIGS. 1, 3 and 4 it can be seen that split nut halves 84 and 86 are in threaded engagement with drive screw 50. Accordingly, if handle 114 is rotated using knob 125, housing 60 being secured thereto will also rotate. Drive nut halves 84 and 86, being disposed in bores 76 and 78, respectively, of housing 60 will also rotate with housing 60. Rotation of the drive nut halves will cause drive screw 50 to move axially through bores 20 and 75, the direction of travel screw 50 being dependent on the direction in which handle 114 is rotated. Since drive screw 50 is threadedly connected to connecting rod 36, axial movement of drive screw 50 is translated into axial movement of connecting rod 36 which, being connected to piston rod 35, results in longitudinal movement of piston 34 in the direction shown by either arrow A or B depending upon which direction handle 114 is being rotated. The provision of nut 52 which keys drive screw 50 to bore 20 prevents torsional load from being transferred to actuator 12 via screw 50. Thus, actuator 12 is subjected only to the axial thrust supplied by screw 50. In this mode, apparatus 10 is being used to move movable member 34 of actuator 12 relative to the stationary member (end cap 22 and housing 30), i.e. actuator 12 is being manually operated rather than by the use of hydraulic or pneumatic power. It should be noted that when the drive nut halves and drive screw 50 are engaged, spring 160 (see FIG. 4) is under no compressional load over and above that imparted initially to insert spring 160 between pin 110 and post 130.

Figure 6:
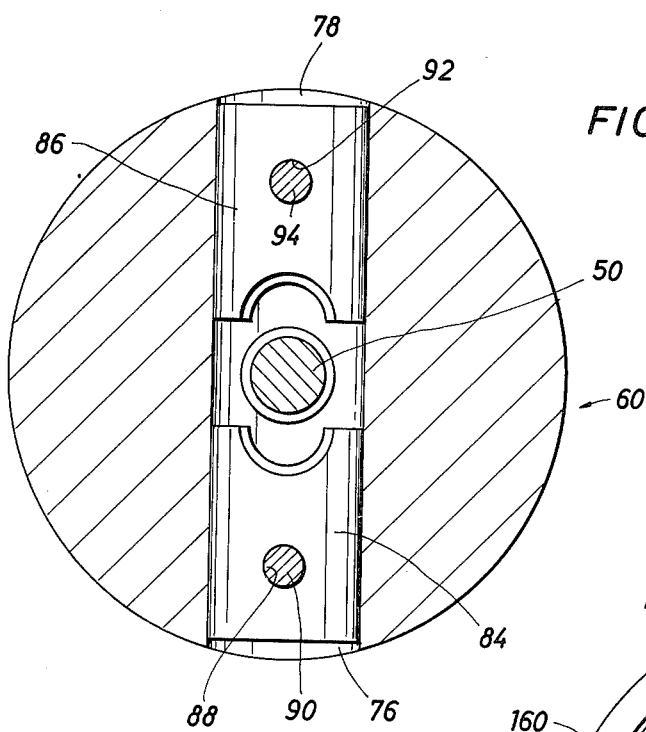
FIG. 6 is a view similar to FIG. 3 showing the drive nut means and drive screw disengaged.
Figure 7:
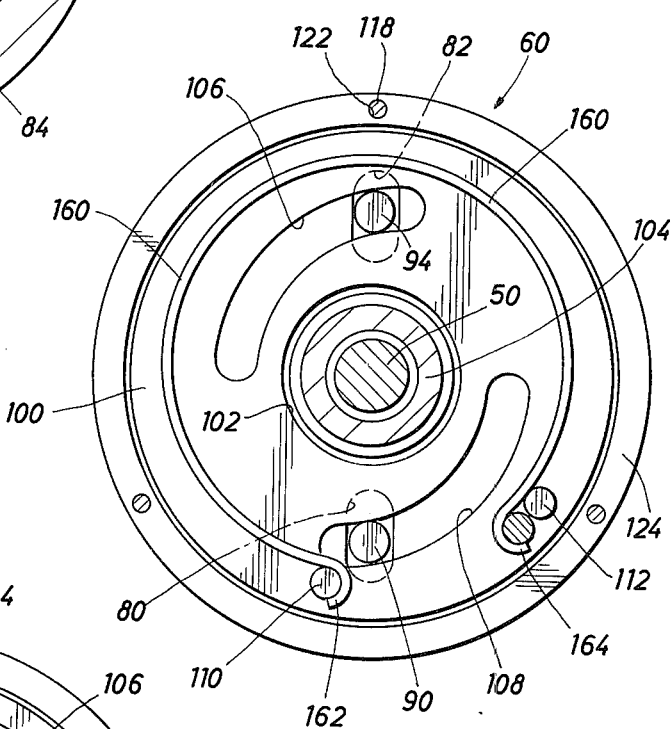
FIG. 7 is a view similar to FIG. 4 showing the position of the biasing means and camming plate when the drive nut means encounters resistance to engagement.

To disengage manual override apparatus 10 and permit normal powered operation of actuator 12, it is only necessary to rotate engagement plate 126 from the position shown in full lines in FIG. 5 to the position shown in phantom lines in FIG. 5. This moves screw 132 and hence post 130 to the position shown in phantom lines in FIG. 5. Since post 130 is in engagement with pin 112, cam plate 100 will be rotated 120° counterclockwise from the position shown in FIG. 4 to the position shown in FIG. 7. In the position shown in FIG. 7, cam pins 90 and 94 have been moved radially outwardly and in turn have moved drive nut halves 84 and 86, respectively, radially outwardly and out of threaded engagement with drive screw 50 (see FIG. 6). Drive screw 50 is now free to move axially in bores 20 and 75 in response to the movement of piston 34 in actuator 12.

Figure 8:
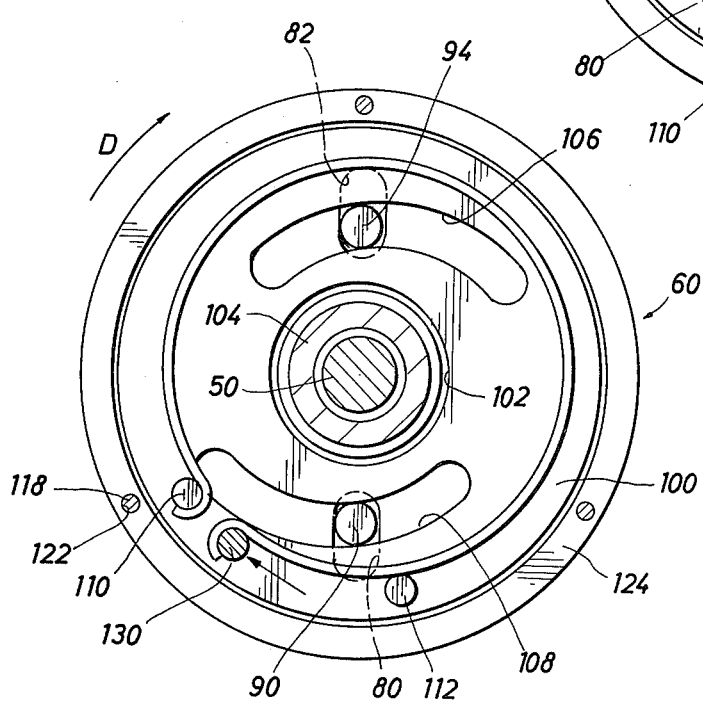
FIG. 8 is a view similar to FIG. 4 showing the position of the biasing means and camming plate when the drive nut means and screw means are disengaged.

In the manual override apparatus described in U.S. Pat. No. 4,080,844, it frequently occurred that when the split nut halves were moved toward engagement with the drive screw, the threads of the split nut halves and the drive screw did not mesh. Accordingly, it was necessary to manually exert an engaging force on the camming plate while rotating the drive screw to effect engagement of the threads. In the manual override apparatus of the present invention, the split nut halves become biased toward engagement if such nonmeshing of the threads or other resistance to engagement occurs. FIG. 8 depicts a condition in which non-meshing of the threads of the split nut halves and the drive screw has occurred. In the condition depicted by FIG. 8, engagement plate 126 has been moved to the position shown in full lines in FIG. 5. Normally, and if the threads had meshed, the position of cam plate 100 and spring 160 would be as shown in FIG. 4. However, because of non-meshing of the threads of the split nut and the drive screw, spring 160 has been compressed, i.e. engagement post 130 has been moved closer to cam plate pin 110. The torsional compression of spring 160 shown in FIG. 8 exerts a biasing force on cam plate 100 which tends to urge cam plate 100 in the direction shown by arrow D. The split nut halves are now biased, via cam plate 100 and cam pins 90 and 94, toward engagement with the drive screw 50. Accordingly, any rotary movement of the split nut which will mesh the threads of the drive screw with the threads of the split nut halves will permit the latter to automatically come into full engagement with the threads of the drive screw. When this occurs, cam plate 100 will move in the direction shown by arrow D and assume the position shown in FIG. 4. At the same time, the increased torsional compression in spring 160 will be released whereupon spring 160 will likewise assume the position shown in FIG. 4.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which should come within the meaning and range of the equivalence of the claims are therefore intended to be embraced therein.

I claim:

1. A selectively engageable manual drive apparatus comprising:
    a body having a bore therethrough;
    a housing secured to said body and having an axial bore registering with said bore in said body;
    rotatable split drive nut means in said housing;
    drive screw means mounted for axial movement in said registering bores in said body and said housing;

camming means for selectively engaging and disengaging said drive nut means and said drive screw means whereby engagement of said drive nut means and said drive screw means and rotation of said drive nut means causes axial movement of said drive screw means; and biasing means operatively connected to said split drive nut means, said biasing means serving to exert a biasing engaging force on said drive nut means when said drive nut means encounters a given magnitude of resistance toward engagement.

2. The apparatus of claim 1 wherein said biasing means is connected to said camming means.

3. The apparatus of claim 1 wherein said drive screw means is substantially coaxial with said axial bore and includes means preventing relative rotation of said drive screw and said body.

4. The apparatus of claim 3 wherein said means for preventing said relative rotation comprises means for keying said drive screw means to said bore in said body.

5. The apparatus of claim 1 wherein said housing is rotatably secured to said body and is rotatable with said drive nut means.

6. The apparatus of claim 5 wherein said drive nut has first and second halves mounted on diametrically opposite sides of said screw means.

7. The apparatus of claim 6 wherein said first and second halves are slidably mounted in opposed coaxial bores in said housing.

8. The apparatus of claim 6 wherein said camming means includes a cam plate having a central opening therein, said central opening being in register with said axial bore in said housing, said cam plate having first and second cam surfaces eccentric with respect to said axial bore and each other, said engaging and disengaging means further including first and second camming pins engageable with said first and second cam surfaces, respectively, said first and second pins being affixed to said first and second halves, respectively, of said drive nut and being generally axially aligned with said drive screw, said cam plate being at least partially rotatable with respect to said housing around the longitudinal axis of said axial bore and said first and second cam surfaces being disposed such that relative rotation of said cam plate and said housing in one direction effects equal and opposite movement of said first and second halves of said drive nut toward said drive screw and relative rotation of said cam plate and said housing in the other direction effects equal and opposite movement of said first and second halves of said drive nut away from said drive screw.

9. The apparatus of claim 8 wherein said camming surfaces are provided by arcuate slots in said plate.

10. The apparatus of claim 8 wherein said biasing means is connected to said camming means.

11. The apparatus of claim 10 wherein said cam plate includes means forming first and second abutment surfaces and there are means for rotating said cam plate, said means for rotating said cam plate including means defining an engagement formation disposed and movable between said first and second abutment surfaces, said biasing means including spring means compressed between one of said abutment surfaces and said engagement formation whereby said engagement formation is normally biased into engagement with the other of said abutment surfaces when said drive nut and said drive screw are disengaged.

12. The apparatus of claim 11 wherein said abutment surfaces are formed by cam plate pins secured to said cam plate.

13. The apparatus of claim 12 wherein said means for rotating said cam plate includes a transfer plate rotatable with respect to said housing, said transfer plate including a transfer post secured thereto and forming said engagement formation.

14. In combination with a normally, automatically powered driving mechanism having a stationary member and a movable member mounted for movement with respect to said stationary member, a manual control apparatus for effecting movement of said movable member comprising:

a body having a bore therethrough;

means for securing said body to said stationary member;

a housing secured to said body and having an axial bore registering with said bore in said body;

rotatable split drive nut means mounted in said housing;

drive screw means mounted for axial movement in said registering bores;

connecting rod means connected to said drive screw means and said movable member;

camming means for selectively engaging and disengaging said drive nut means and said drive screw means whereby engagement of said drive nut means and said drive screw means and rotation of said drive nut means causes axial movement of said drive screw means thereby effecting movement of said movable member, and biasing means operatively connected to said split drive nut means, said biasing means serving to exert a biasing engaging force on said drive nut means when said drive nut means encounters a given magnitude of resistance toward engagement.

15. The mechanism of claim 14 when said drive screw means includes means for preventing transfer of torsional loads form said drive screw to said normally, automatically powered driving mechanism.

16. Mechanism of claim 15 when said means for preventing transfer of torsional loads comprises means for keying said drive screw means to said bore in said body.

17. The mechanism of claim 14 when said housing is rotatably secured to said body and is rotatable with said drive nut means.

18. The mechanism of claim 14 when said drive nut has first and second halves mounted on diametrically opposite sides of said screw means.

19. The mechanism of claim 18 when said first and second halves are slidably mounted in opposed coaxial bores in said housing.

20. The apparatus of claim 18 wherein said means for selectively engaging and disengaging includes a cam plate having a central opening therein, said central opening being in register with said axial bore in said housing, said cam plate having first and second cam surfaces eccentric with respect to said axial bore and each other, said engaging and disengaging means further including first and second camming pins being engageable with said first and second cam surfaces respectively, said first and second pins being affixed to said first and second halves, respectively, of said drive nut and being generally axially aligned with said drive screw, said cam plate being at least partially rotatable with respect to said housing around the longitudinal axis of said axial bore and said first and second cam surfaces being disposed such that relative rotation of said cam plate and said housing in one direction effects equal and opposite movement of said first and second halves of said drive nut toward said drive screw and relative rotation of said cam plate and said housing in the other direction effects equal an opposite movement of said first and second halves of said drive nut away from said drive screw.

21. The apparatus of claim 20 wherein said camming surfaces are provided by arcuate slots in said plate.

22. The apparatus of claim 20 wherein said biasing means is connected to said camming means.

23. The apparatus of claim 22 wherein said cam plate includes means forming first and second abutment surfaces and there are means for rotating said cam plate, said means for rotating said cam plate including means defining an engagement formation disposed and movable between said first and second abutment surfaces, said biasing means including spring means compressed between one of said abutment surfaces and said engagement formation whereby said engagement formation is normally biased into engagement with the other of said abutment surfaces when said drive nut and said drive screw are disengaged.

24. The apparatus of claim 23 wherein said abutment surfaces are formed by cam plate pins secured to said cam plate.

25. The apparatus of claim 24 wherein said means for rotating said cam plate includes a transfer plate rotatable with respect to said housing, said transfer plate including a transfer post secured thereto and forming said engagement formation.

* * * * *